US007583280B2

(12) United States Patent
Kubo et al.

(10) Patent No.: US 7,583,280 B2
(45) Date of Patent: Sep. 1, 2009

(54) IMAGE DISPLAY DEVICE

(75) Inventors: Manabu Kubo, Tokyo (JP); Tohru Kurata, Saitama (JP); Kimitaka Wada, Kanagawa (JP); Toshiyuki Kaimi, Tokyo (JP)

(73) Assignee: Sony Corporation, Tokyo (JP)

( * ) Notice: Subject to any disclaimer, the term of this patent is extended or adjusted under 35 U.S.C. 154(b) by 446 days.

(21) Appl. No.: 11/117,350

(22) Filed: Apr. 29, 2005

(65) Prior Publication Data

US 2005/0253878 A1 Nov. 17, 2005

(30) Foreign Application Priority Data

May 13, 2004 (JP) ............................ 2004-143173

(51) Int. Cl.
*G09G 5/02* (2006.01)

(52) U.S. Cl. ...................................... 345/698; 345/545

(58) Field of Classification Search ................. 345/501, 345/520, 530, 531, 1.1, 3.4, 600, 1.3, 545-548, 345/698

See application file for complete search history.

(56) References Cited

U.S. PATENT DOCUMENTS 6,522,341 B1 * 2/2003 Nagata ....................... 345/639
6,525,742 B2 * 2/2003 Nonomura et al. .......... 345/603
6,870,538 B2 * 3/2005 MacInnis et al. ............ 345/505
7,091,944 B2 * 8/2006 Wang ......................... 345/100
2003/0184678 A1 10/2003 Chen et al.
2004/0085283 A1 5/2004 Wang

FOREIGN PATENT DOCUMENTS

JP 2-28694 1/1990
JP 3-287229 12/1991
JP 2001-197365 7/2001

OTHER PUBLICATIONS

Feng Tao, et al., "An architecture and implementation of Image Scaling Conversion", ASIC, 2001. Proceedings. 4th International Conference, IEEE, XP-010576797, Oct. 23-25, 2001, pp. 409-410.

* cited by examiner

*Primary Examiner*—Alexander Eisen
*Assistant Examiner*—Kenneth B Lee, Jr.
(74) *Attorney, Agent, or Firm*—Oblon, Spivak, McClelland, Maier & Neustadt, P.C.

(57) ABSTRACT

An image display device that resolution-converts input image data to perform image display. The image display device includes an image memory storing the input image data, a control section specifying an effective range from the input image data, and a resolution converting section reading image data within the effective range from the image memory, and resolution-converts the image data within the effective range to obtain as a resolution of output image data. The resolution converting section starts reading of the image data of a single screen from said image memory before writing of the image data of the single screen is completed.

6 Claims, 8 Drawing Sheets

VIDEO SIGNAL OUTPUT
7
RESOLUTION CONVERSION AND ELECTRONIC ZOOM
5
SIGNAL PROCESSING
CONTROL SECTION
6
4
A/D
3
IMAGING ELEMENT
1
2

(a) IMAGE MEMORY ADDRESS
(b) INPUT SYNCHRONIZATION V
(c) INPUT IMAGE
(d) MEMORY WRITING
(e) MEMORY READING
(f) OUTPUT IMAGE
(g) OUTPUT SYNCHRONIZATION
(h) INPUT IMAGE OUTLINE
(i) OUTPUT IMAGE OUTLINE
WRITE
READ
V
V/2
t1
t2
t3
t4
t5
SCREEN 1
SCREEN 2
SCREEN 3
1920
540
1440

(a) IMAGE MEMORY ADDRESS
(b) INPUT SYNCHRONIZATION V
(c) INPUT IMAGE
(d) MEMORY WRITING
(e) MEMORY READING
(f) OUTPUT IMAGE
(g) OUTPUT SYNCHRONIZATION
(h) INPUT IMAGE OUTLINE
(i) OUTPUT IMAGE OUTLINE
WRITE
READ
t11
t12
t13
t14
t15
t16
SCREEN 1
SCREEN 2
SCREEN 3
V
1920
540
1440
RELATED ART (a) IMAGE MEMORY ADDRESS
(b) INPUT SYNCHRONIZATION V
(c) INPUT IMAGE
(d) MEMORY WRITING
(e) MEMORY READING
(f) OUTPUT IMAGE
(g) OUTPUT SYNCHRONIZATION
(h) INPUT IMAGE OUTLINE
(i) OUTPUT IMAGE OUTLINE
WRITE
READ
SCREEN 1
SCREEN 2
SCREEN 3
V
1920
540
1440
540
RELATED ART (a) IMAGE MEMORY ADDRESS
(b) INPUT SYNCHRONIZATION V
(c) INPUT IMAGE
(d) MEMORY WRITING
(e) MEMORY READING
(f) OUTPUT IMAGE
(g) OUTPUT SYNCHRONIZATION
(h) INPUT IMAGE OUTLINE
(i) OUTPUT IMAGE OUTLINE
WRITE
READ
SCREEN 1
SCREEN2
SCREEN 2
SCREEN 3
V
540
1920
1440
2
3
RELATED ART

IMAGE DISPLAY DEVICE

CROSS REFERENCES TO RELATED APPLICATIONS

The present document contains subject matter related to Japanese Patent Application JP 2004-143173 filed in the Japanese Patent Office on May 13, 2004, the entire contents of which being incorporated herein by reference.

BACKGROUND OF THE INVENTION

1. Field of the Invention

The present invention relates to an image display device with a function of resolution-converting an input image and outputting the resultant image, and more particularly to an image display device capable of reducing a capacity of an image memory temporarily storing the input image during the resolution conversion.

2. Description of Related Art

Conventionally, by providing an imaging device converting an image to an electrical signal, for example a video camera or the like, with an image memory temporarily storing a captured image, a function of exerting effects of camera-shake correction, electronic zoom and the like is added. The camera-shake correction is such that camera-shake information of a videographer (user of the video camera) is acquired with a gyro sensor or the like, and on the basis of the information, part of the image is cut out, and in order to magnify or contract the cut-out part to a standard angle of view, pixel values are interpolated by using adjacent pixel values, so that the image is electrically magnified or contracted. Furthermore, the electronic zoom is such that part of the image is cut out and in order to magnify the cut-out part to a standard angle of view, short pixel values are interpolated by using adjacent pixel values, so that the image is electrically magnified.

FIG. 7 illustrates one example of a timing chart showing the memory address transition and the image input and output timing of an image memory of continuous three screens at the time of full screen display in a related art image display device. This example shows how an input image signal of horizontal 1920 pixels×vertical 540 lines is resolution-converted to an output image signal of horizontal 1440 pixels×vertical 540 lines.

The image memory is made up of a ring buffer, writing is indicated by a broken line, and reading is indicated by a solid line. The address of the image memory starts with 0, and every time one line is written, a value equivalent to the one line is added. When the address reaches the end of the image memory, the address returns to 0 as illustrated, and again, every time one line is written, a value equivalent to the one line is added. The address is held even after the processing of one screen is completed, and the processing of the next screen is continuously performed from an end address of the previous screen.

An input synchronization signal and an output synchronization signal are sent in synchronization with each other, and while an image is being written into the image memory, an image 1V-period before the relevant image is being read from the image memory. Namely, for example, a screen-1 written into the image memory for a period (t11 to t12) is resolution-converted and read from the image memory for a period delayed by 1V (t13 to t14). In this period (t13 to t14), a screen-2 of the next screen is written simultaneously. Similarly, in a period (t15 to t16), simultaneously with the writing of a screen-3, the screen 2 which is a screen immediately before the relevant screen 3 is read.

Furthermore, FIG. 8 shows, as an operational example in which the camera-shake correction is assumed in the related art image display device, how, with horizontal 1600 pixels×vertical 450 lines positioned at a central part thereof specified as an effective range, an input image resolution of horizontal 1920 pixels×vertical 540 lines is resolution-converted to an output image resolution of horizontal 1440 pixels×vertical 540 lines.

Furthermore, as another operational example in which the camera-shake correction is assumed in the related art image display device, FIG. 9 shows address transition and a image input and output timing of the image memory when the effective range is varied so as to be horizontal 1600 pixels×vertical 450 lines (an upper part of the screen), horizontal 960 pixels×vertical 360 lines (a center of the screen), and horizontal 1600 pixels×vertical 450 lines (a lower part of the screen) in order.

In either case shown in FIGS. 8 and 9, similar to the operational example shown in FIG. 7, an input synchronization signal and an output synchronization signal are sent in synchronization with each other, and while an image is being written into the image memory, an image 1V-period before the relevant image is being read. In these examples, while a writing period of the input image varies corresponding to a line position of the effective range image, a reading period does not vary and the images are outputted at constant output timing.

SUMMARY OF THE INVENTION

As described above, in the related art image display device, the image memory temporarily storing the input image requires at least a storage capacity of one screen (field or frame). Accordingly, for example, when luminance and color-difference signals of one field of a high definition (HD) video are stored at 8 bits, respectively, about 12 Mbits is required for the storage capacity, which causes a problem that the image memory is not only increased in size but also in price.

Consequently, there is disclosed a method in which a compression encoding circuit is provided on the input side of the image memory and a decompression decoding circuit is provided on the output side of the image memory, so that a smaller storage capacity of the image memory is required, or a method in which a quantization coefficient at the time of compression is controlled by an electronic zoom magnification (refer to Japanese Patent No. 3406924.).

While the above configuration can contribute to partial reduction of the image memory to a certain extent, additional circuits such as the compression encoding circuit and the decompression decoding circuit are required and the application of a compression processing technique considerably deteriorates the image quality. In particular, there is a problem in that during electronic zoom, combined with deterioration in image quality by electronic zoom itself, the image quality is further deteriorated.

In light of the above-described problems, the present invention has been achieved, and it is desirable to provide an image display device in which an image memory capacity required for resolution conversion can be largely reduced without using any compression processing technique.

In order to solve the above-described problems, an image display device of the present invention includes an image memory storing input image data, a control section specifying an effective range from the input image data, and a resolution converting section which reads image data within the effective range from the image memory and resolution-converts the image data within the effective range to obtain a resolution of output image data, in which, in the resolution converting section, before writing of the image data of one screen is completed, reading of the image data of the relevant one screen from the image memory is started.

In the present invention, since before the writing of the image data of one screen into the image memory is completed, the reading of the image data of the relevant one screen is started, the input image data can be resolution-converted to the output image data without requiring a storage capacity of one screen for the image memory.

In particular, if an output synchronization signal is outputted (½) V-period behind an input synchronization signal (period V) of the input image data, the capacity of the image memory can be sufficiently about half of one screen, which can largely reduce the capacity of the image memory as compared with that of the related art.

According to the image display device of the present invention, since before the writing of the image data of one screen into the image memory is completed, the reading of the image data of the relevant once screen is started, the capacity of the image memory can be reduced as compared with that of the related art, thereby achieving downsizing and cost reduction of the image memory. Furthermore, output timing of the image can be performed earlier than that of the related art.

DESCRIPTION OF PREFERRED EMBODIMENTS

Hereinafter, an embodiment of the present invention is described with reference to the drawings.

Figure 1:
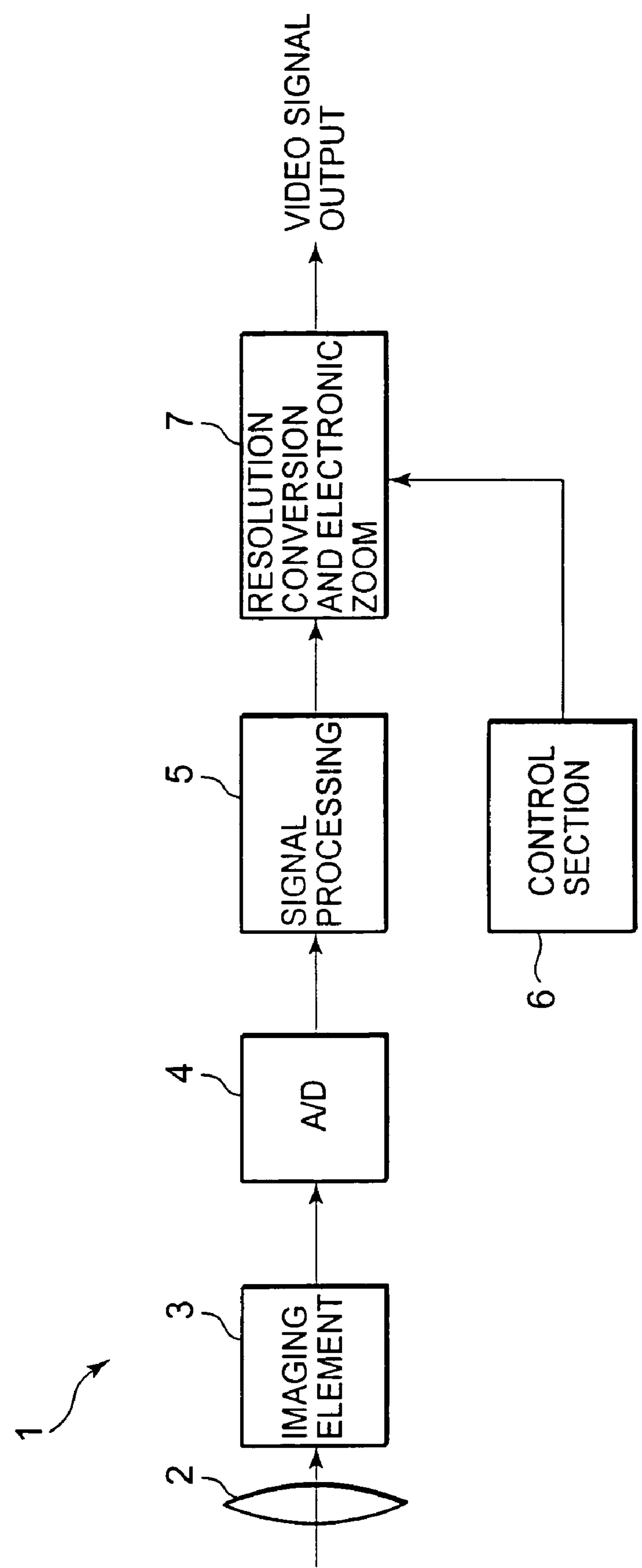
FIG. 1 is a schematic block diagram of an image display device of an embodiment of the present invention.

FIG. 1 is a schematic block diagram of an image display device 1 according to an embodiment of the present invention. In the present embodiment, an example applied to a digital video camera as the image display device 1 is described. The image display device 1 has an image capturing lens 2, an imaging element 3, an A/D converter 4, a signal processing circuit 5, a control section 6, and a resolution conversion and electronic zoom circuit section (hereinafter, referred to as "resolution converting section") 7.

The imaging element 3 is made up of, for example, a CCD (Charge Coupled Device) image sensor or the like, and an object optical image taken in through the image-capturing lens 2 is converted to an electrical signal and is supplied to the A/D converter 4. The A/D converter 4 converts the analog image signal from the imaging element 3 to a digital image signal and then supplies it to the signal processing circuit 5. The signal processing circuit 5 performs well-known camera signal processing such as gamma correction and color balance adjustment, and a luminance signal and a color-difference signal are outputted as image signals of 8 bits, respectively. The control section 6 specifies an effective range of the input image in accordance with camera-shake correction and electronic zoom.

Figure 2:
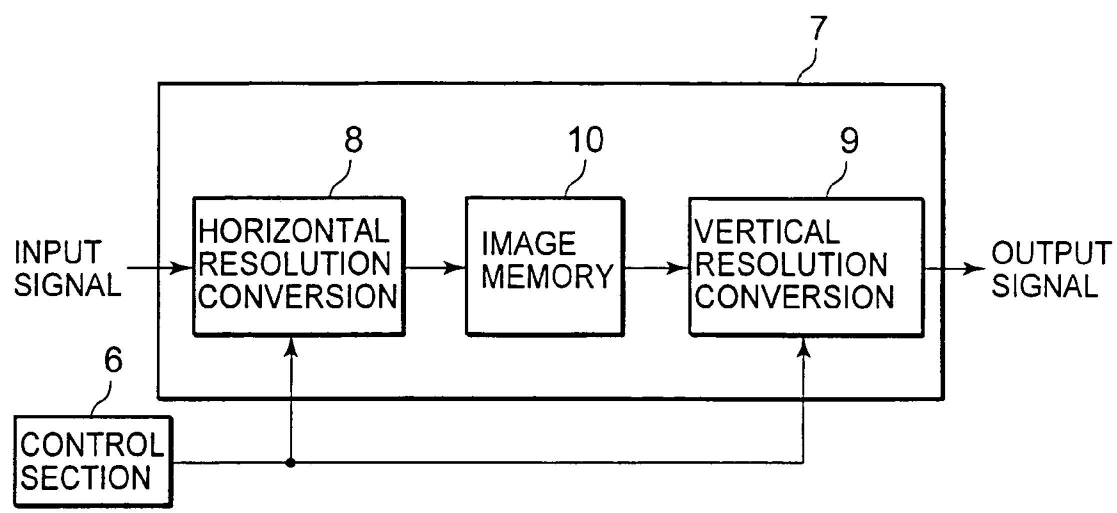
FIG. 2 is a block diagram showing a configuration example of a resolution converting section of the present invention.

The resolution converting section 7 extracts only necessary image data in accordance with effective range information from the control section 6 and outputs the image signal (video signal) which has been resolution-converted to obtain the resolution as an output image. The resolution converting section 7 comprises a horizontal resolution conversion circuit 8, a vertical resolution conversion circuit 9 and an image memory 10, as shown in FIG. 2.

The horizontal resolution conversion circuit 8 is arranged at the pre-stage of the image memory 10, and extracts only in an effective range specified by the control section 6 with respect to a lateral direction (horizontal direction) among the input images from the signal processing circuit 5 and resolution-converts it by interpolating operation to obtain the resolution as the output image. The processing is performed on a line-by-line basis. When the processed line is within the effective range, it is written into the image memory 10.

The vertical resolution conversion circuit 9 is arranged at the post-stage of the image memory 10, and reads data of lines in the effective range specified by the control section 6 and resolution-converts it by interpolating operation to obtain the resolution as the output image with respect to a longitudinal direction (vertical direction).

The image memory 10 is made up of a semiconductor memory such as a DRAM and temporarily stores the image data of the input image which has been resolution-converted by the horizontal resolution conversion circuit 8 to obtain the horizontal resolution as the output image. In the present embodiment, the capacity of the image memory 10 (X*Y) is as follows:

X=a resolution of the output image in the lateral direction

Y=½ of the number of lines of the input image in the longitudinal direction+margin (about 10%).

Accordingly, the entire image data of one screen of the input image cannot be written into the image memory 10. Consequently, in the present embodiment, before the writing of the image data of one screen into the image memory 10 is completed, the reading of the image data of the relevant one screen is started. In other words, while the input image is inputted continuously at regular periods V in conformity to a synchronization signal similarly to the related art, the output image is outputted continuously at the regular periods V, but (½) V-period behind the input image, which is different from the related art.

Figure 4:
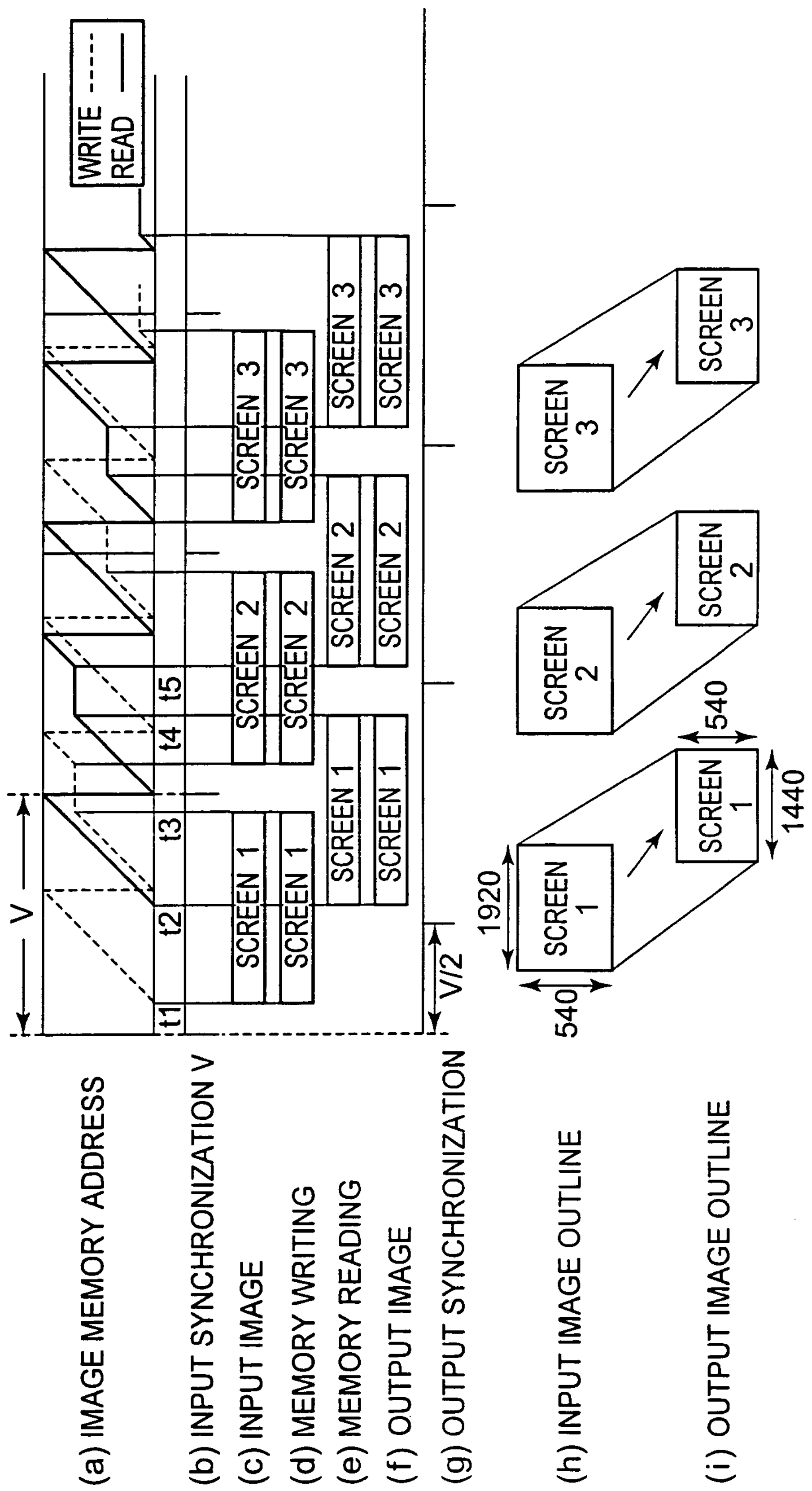
FIG. 4 is a timing chart showing address transition and an input/output timing of an image in an image memory for explaining an operation of the present invention.

An operational example of the present embodiment is described by using a timing chart showing the address transition and the image input/output timing in the image memory for continuous three screens when the whole screen is displayed as shown in FIG. 4. This example shows how an input image signal of horizontal 1920 pixels×vertical 540 lines is resolution-converted to the output image signal of horizontal 1440 pixels×vertical 540 lines.

The image memory 10 is made up of a ring buffer, and writing is indicated by a broken line and reading is indicated by a solid line. The address of the image memory 10 starts with 0 and every time one line is written, a value equivalent to the one line is added. In a case where the address reaches the end of the image memory, the address returns to 0 as illustrated, and again, every time one line is written, a value equivalent to the one line is added. The address is held even after the processing of one screen is finished, and the processing of the next screen is continuously performed from an end address of the previous screen.

As shown in FIG. 4, the input image is inputted continuously at regular periods V in conformity with the synchronization signal. Furthermore, an output synchronization signal is asynchronous with the input synchronization signal, and in particular, in the present embodiment, the output image is outputted continuously at regular periods V but (½) V-period behind the input image.

The input image data relating to a screen-1 is resolution-converted in order from a line at the top of the screen by the lateral resolution conversion circuit 8, and the resolution-converted image data is sequentially written at an address of the image memory 10 on a line-by-line basis. In FIG. 4, in a case where a period from t1 to t3 is required for writing the whole input image data of the screen-1 into the image memory 10, a capacity of the image memory 10 in the horizontal direction is only about half of the number of lines of the input image data, so that, for example, the image data located in the lower half lines of the input image data is written over the image data of the lines written previously.

In the present embodiment, as shown in FIG. 4, the vertical resolution conversion processing of the input image data relating to the screen-1 by the vertical resolution conversion circuit 9 is started, before the writing of the input image data relating to the screen-1 into the image memory 10 is completed, at a time t2 when (½) V-period elapses from image input. Within this period of (½) V time, the vertical resolution conversion processing is performed from the top line to a lower predetermined line of the input image data which has been written into the image memory 10. Thereby, before the first half of the input image data is deleted by the overwriting of the latter half, the output image can be outputted at the vertical resolution as the output image.

The reading processing of the input image data relating to the screen-1 by the vertical resolution conversion circuit 9 is performed for a period from t2 to t5 as shown in FIG. 4. At a time t4 within the period, the writing processing of input image data relating to a next screen-2 into the image memory 10 by the horizontal resolution conversion circuit 8 is started. Then, in a manner similar to the foregoing, the image data relating to the relevant screen-2 is read at a time when (½) V elapses from the input of the image data relating to the screen-2, and thereafter, the writing and reading of a subsequent screen-3 are sequentially performed.

A writing speed and a reading speed of the input image data when the entire screen is displayed are identical, so that the writing processing of the image data does not overtake the reading processing.

Figure 5:
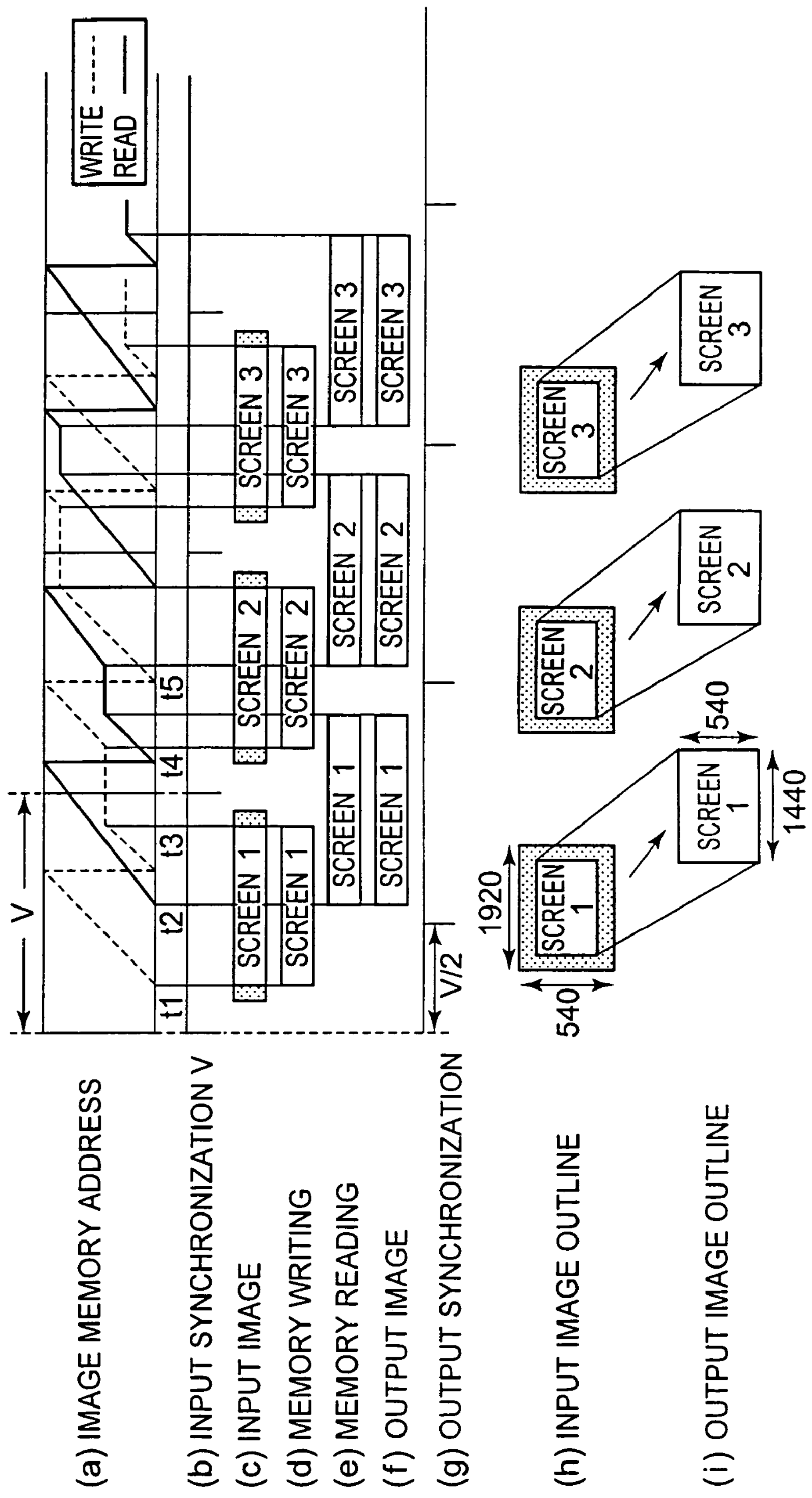
FIG. 5 is a timing chart showing address transition and an input/output timing of an image in an image memory for explaining another operation of the present invention.

On the basis of the foregoing operational example, taking the following resolutions in which the camera-shake correction and the electronic zoom are assumed as examples, a description is given with reference to FIG. 5.

An example of FIG. 5 shows how, with horizontal 1600 pixels×vertical 450 lines in the center of the screen specified as the effective range, the input image resolution of horizontal 1920 pixels×vertical 540 lines is resolution-converted to the output image resolution of horizontal 1440 pixels×vertical 540 lines, and shows the transition and timing of the image memory 10 when the processing of continuous three screens is performed at the above-mentioned resolutions.

The horizontal resolution conversion circuit 8 extracts from the data of 1920 pixels per line a part of 1600 pixels specified by the control section 6 in the input image relating to the screen-1, and further the extracted part is resolution-converted to the horizontal resolution 1440 of the output image. When the converted line is included in the effective range in the vertical direction, the converted data is written at a predetermined address on the image memory 10 (for the period from t1 to t3). The writing address starts with 0 and every time one line is written, and a value equivalent to the one line is added. When the address reaches the end of the image memory 10, the address returns to 0 and the processing is repeated. The address is held even after the processing of one screen is completed, and the processing of the next screen (screen-2) is continuously performed from an end address of the previous screen (screen-1).

The vertical resolution conversion circuit 9 starts the processing after (½) V time elapsed since the input of the image data relating to the screen-1 (at t2). While this (½) V time is elapsing, the horizontal resolution conversion of half the input image is completed and the input image subjected to the horizontal resolution conversion is being written into the image memory 10. The vertical resolution conversion circuit 9, as shown in FIG. 5, starts reading of data of lines to be processed from the image memory 10 at the time t2, resolution-converts the data to obtain as the vertical output resolution 540, and outputs them. At this time, a reading address from the image memory 10 is set on the grounds that only the lines in the effective range are written into the image memory 10.

The reading processing of the input image data relating to the screen-1 by the horizontal resolution conversion circuit 9 is performed for a period from t2 to t5 as shown in FIG. 5. At the time t4 within the period, the writing processing of the input image data relating to the next screen-2 into the image memory 10 by the horizontal resolution conversion circuit 8 is started. In a manner similar to the foregoing, the image data relating to the relevant screen-2 is read at a time when (½) V-period elapses from the input of the image data relating to the screen-2, and thereafter, the writing and reading of the subsequent screen 3 are sequentially performed.

As a result of the above-described processing, the image of the effective range in the input data is resolution-converted to obtain as the resolution of the output image, and the resultant image data is outputted (½) V-period behind the input image. This output delay time of (½) V denotes that the output of the output image data is performed earlier than the output delay time (V) of the related art, and by way of this, speeding up the control over the camera-shake correction and the electronic zoom can be achieved.

As described above, according to the present embodiment, as compared with the related art image memory requiring a capacity of one screen (field or frame) for the camera-shake correction and the electronic zoom, the memory capacity can be reduced approximately to half without deteriorating image quality and adding a compression/decompression circuit, so that downsizing and cost cutting of the image memory 10 can be achieved.

In the present embodiment, since the output image is outputted (½) V-period behind the input image, a head line in the effective range is limited to lines in the upper half (½) of the input image. However, with regard to the camera-shake correction and the electronic zoom, there are few cases where the vicinity of the center of the screen is set as the effective screen, and thus there is no problem in particular.

Furthermore, the output delay timing of the output image with respect to the input image is not limited to the above-mentioned (½) V-period but can become earlier or later. In the former case, the memory capacity can be further reduced; however, it is desirable for control that the head line of the effective range image necessary for the camera-shake correction and the electronic zoom be written into the image memory 10.

Figure 6:
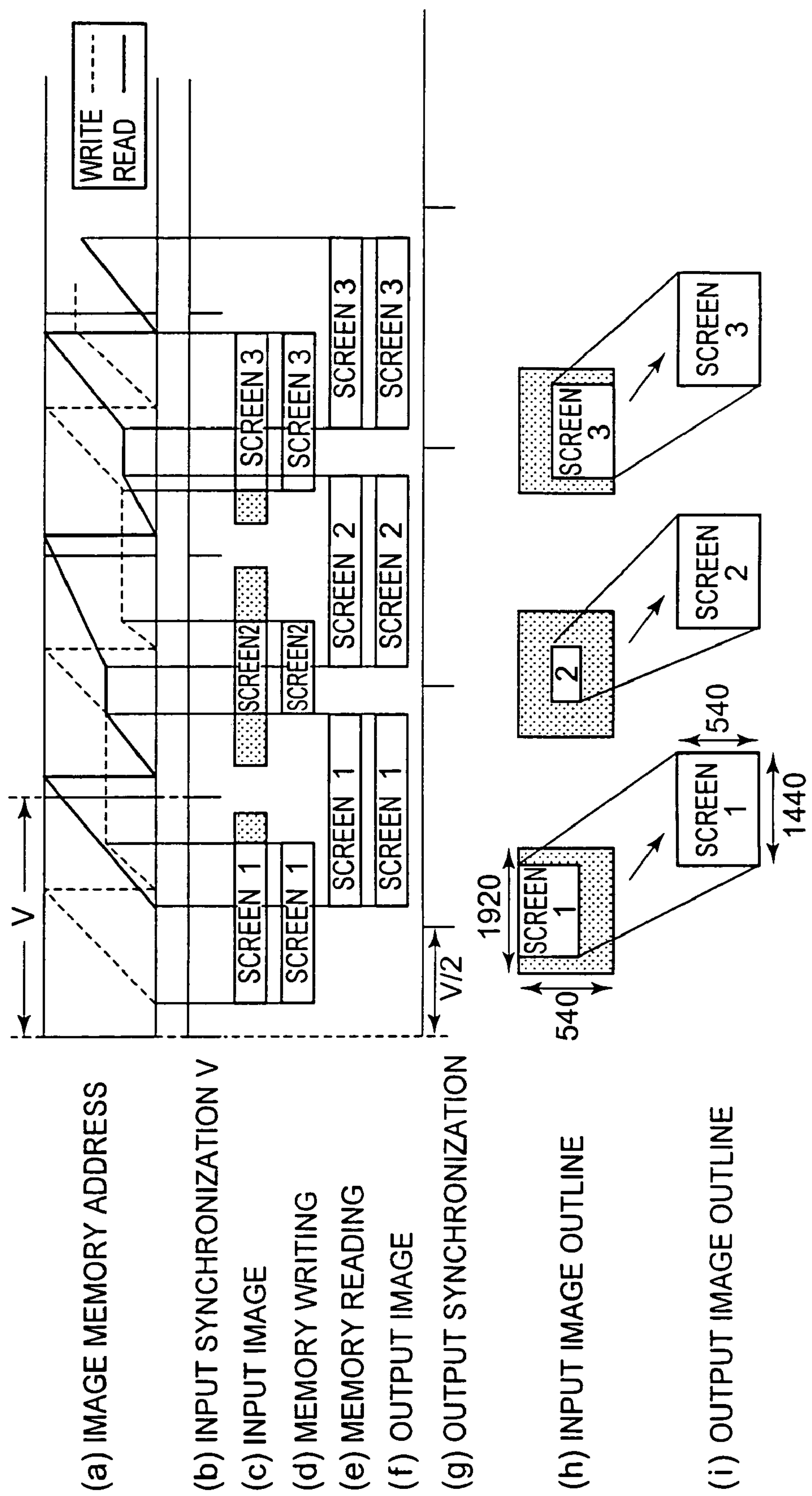
FIG. 6 is a timing chart showing address transition and an input/output timing of an image in an image memory for explaining still another operation of the present invention.
Figure 7:
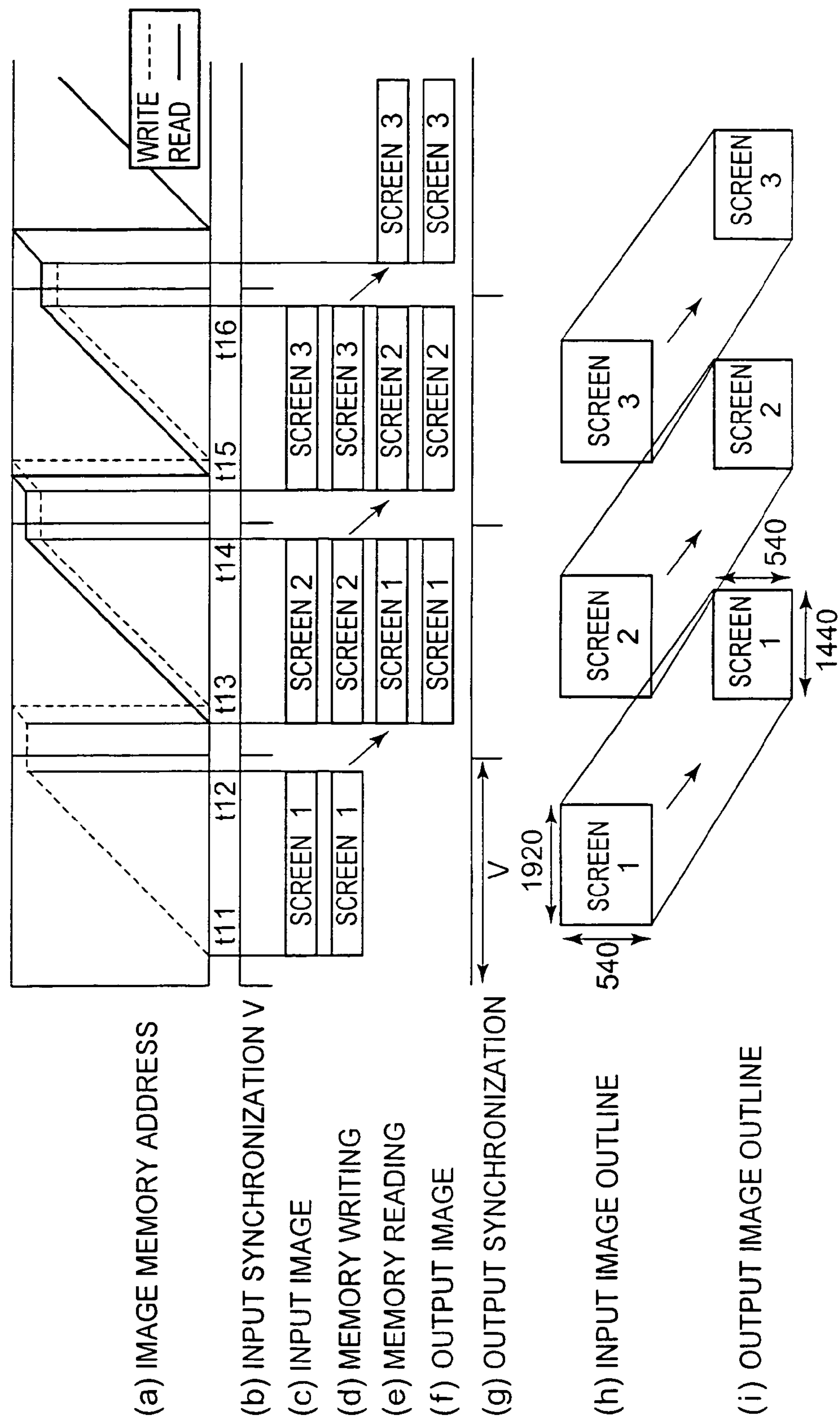
FIG. 7 is a timing chart showing address transition and an input/output timing of an image in an image memory for explaining an operation of a related art image display device.
Figure 8:
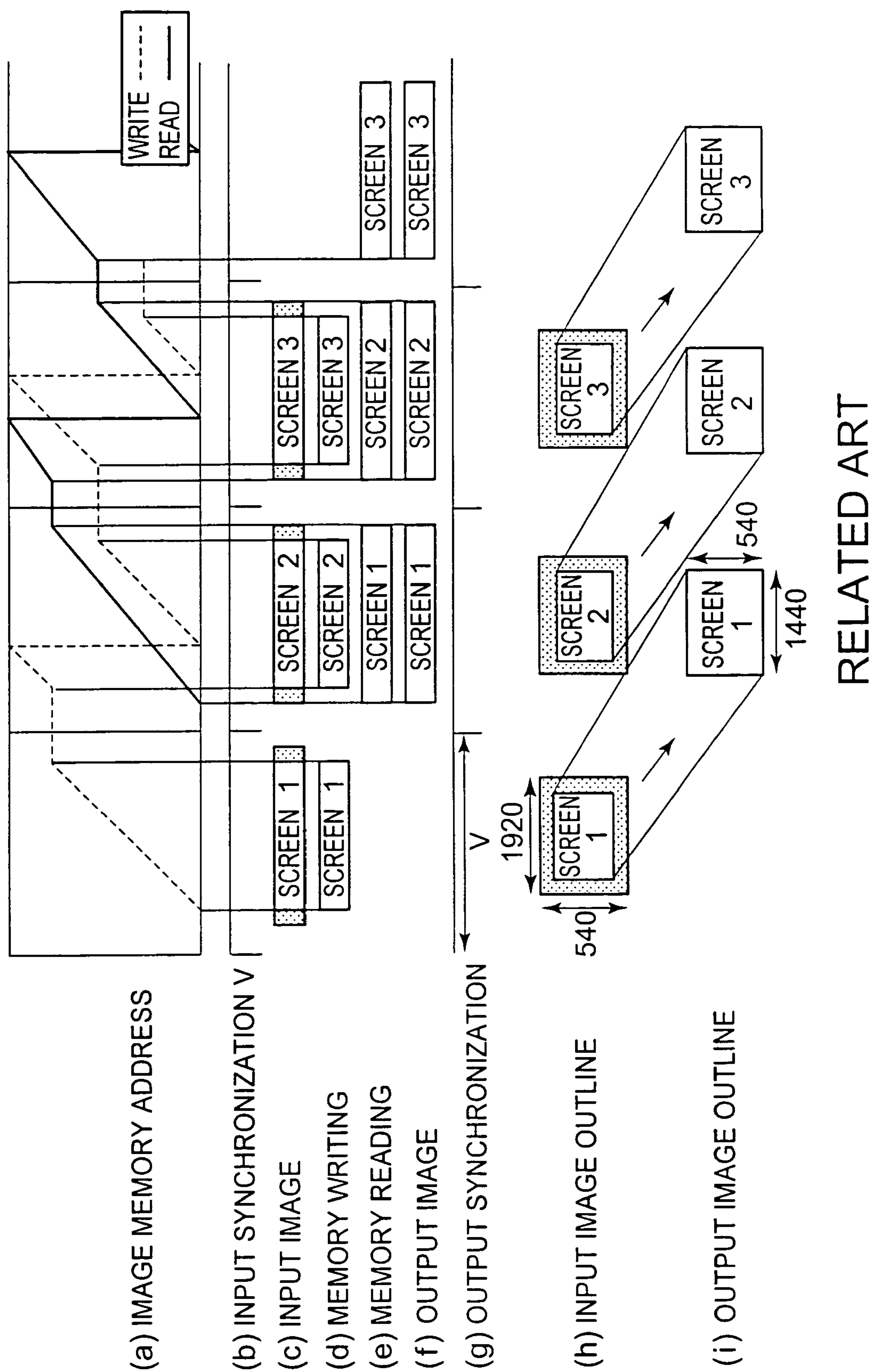
FIG. 8 is a timing chart showing address transition and an input/output timing of an image in an image memory for explaining another operation of a related art image display device.
Figure 9:
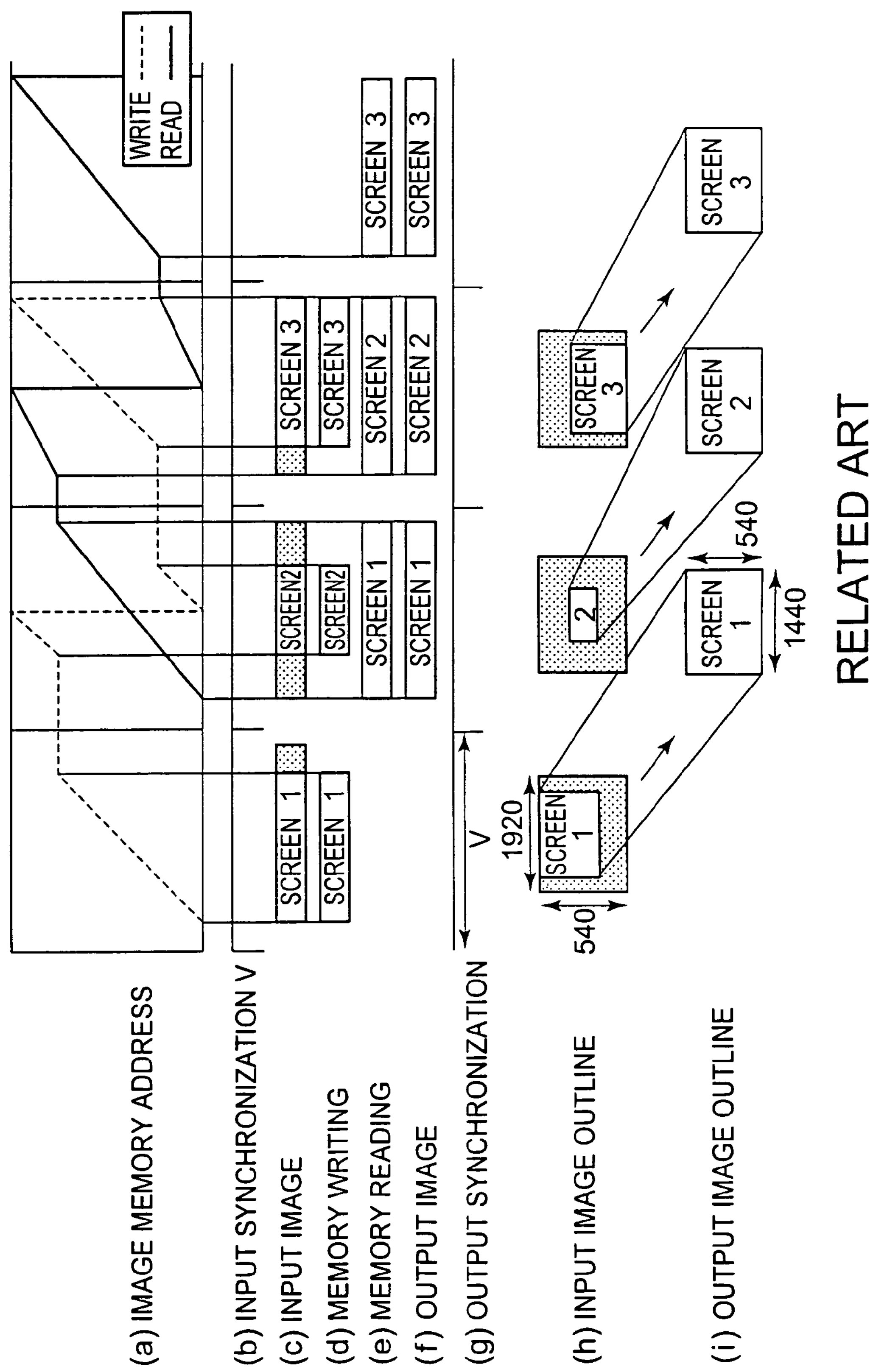
FIG. 9 is a timing chart showing address transition and an input/output timing of an image in an image memory for explaining still another operation of a related art image display device.

FIG. 6 shows another operational example of the present invention, wherein the effective range is varied so as to be horizontal 1600 pixels×vertical 450 lines (an upper part of the screen (the screen-1)), horizontal 960 pixels×vertical 360 lines (a center of the screen (the screen-2)) and horizontal 1600 pixels×vertical 450 lines (a lower part of the screen (the screen-3)) with respect to the input image resolution of horizontal 1920 pixels×vertical 540 lines, and the transition and timing of the image memory 10 when the images of the respective effective ranges are resolution-converted to obtain as the output image resolution of horizontal 1440 pixels× vertical 540 lines are shown.

In the example of FIG. 6, the effective range can be specified for each of the screen-1, the screen-2 and the screen-3. Furthermore, the resolution conversion processing similar to the foregoing is performed, and as a result, the effective range in the input image is resolution-converted to obtain as the resolution of the output image and the resultant image is outputted (½) V-period behind the input image. The output of this output image data is performed at the constant reading speed regardless of a data amount of the effective range image.

While the embodiment of the present invention is described above, it is obvious that the present invention is not limited to this but various modifications can be made on the basis of the technical idea of the present invention.

Figure 3:
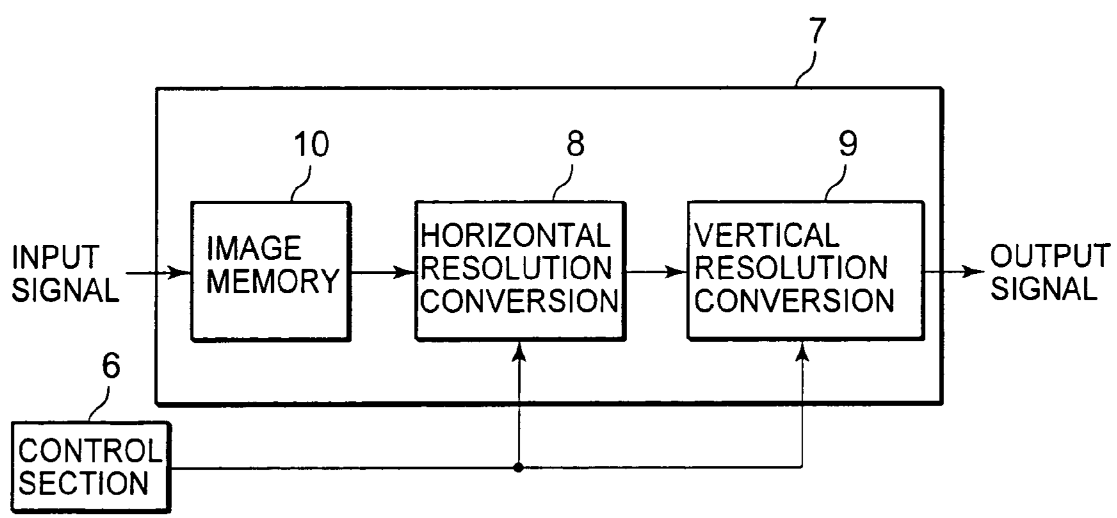
FIG. 3 is a block diagram showing another configuration example of the resolution converting section.

For example, in the above-described embodiment, as the resolution converting section 7, the configuration example in which the horizontal resolution conversion circuit 8, the image memory 10, and the vertical resolution conversion circuit 9 are arranged in order from the front stage side is described, as shown in FIG. 2. However, in a case where the horizontal resolution of the input image is smaller than the horizontal resolution of the output image, a configuration example in which the image memory 10, the horizontal resolution conversion circuit 8 and the vertical conversion circuit 9 are arranged in order from the front stage side as shown in FIG. 3 can also be applied.

Obviously, the resolution of the input image data, the resolution of the output image data, the resolution of the effective range image and the like are not limited to the above-described examples, and they can be changed in accordance with specification or the like.

Furthermore, while a description is given while exemplifying a video camera as the image display device 1, the present invention is not limited to this but can be applied to a moving picture mode of a digital still camera or the like, for example.

It should be understood by those skilled in the art that various modifications, combinations, sub-combinations and alterations may occur depending on design requirements and other factors insofar as they are within the scope of the appended claims or the equivalents thereof.

What is claimed is:

1. An image display device resolution-converting input image data to perform image display, comprising:

an image memory storing the input image data and configured to have a size which is less than a size of an image data of a single screen;

a control section specifying an effective range from the input image data; and a resolution converting section reading image data only within said effective range from said image memory and resolution-converting the image data within the effective range to obtain the image data as a resolution of output image data, wherein:

said resolution converting section starts reading of the image data of a single screen from said image memory before writing of the image data of the single screen is completed.

2. The image display device as claimed in claim 1, wherein:

said resolution converting section has a horizontal resolution conversion circuit writing the input image data converted to the image data as horizontal resolution of the output image data and a vertical resolution conversion circuit reading out the input image data written in said image memory and converting the read out data to the data as vertical resolution of the output image data so as to output the resultant data.

3. The image display device as claimed in claim 1, wherein said an input synchronization signal of said image data input to said image memory and an output synchronization signal output from said image memory are asynchronous to each other.

4. The image display device as claimed in claim 3, wherein, setting a period of said input synchronization signal to V, said output synchronization signal is output (½) V behind said input synchronization signal.

5. The image display device as claimed in claim 1, wherein a capacity of said image memory is set to be corresponding to a product of horizontal resolution of said output image data and a half of the line number of said output image data.

6. The image display device as claimed in claim 1, wherein said image memory comprises a ring buffer.

* * * * *